United States Patent [19]

Kurz

[11] Patent Number: 4,679,211
[45] Date of Patent: Jul. 7, 1987

[54] REGULATION OF PICTURE SIZE WITH VARYING SCAN FREQUENCY

[75] Inventor: Walter Kurz, Kitchener, Canada

[73] Assignee: Electrohome Limited, Kitchener, Canada

[21] Appl. No.: 749,518

[22] Filed: Jun. 27, 1985

[51] Int. Cl.⁴ .................... H01J 29/70; H01J 29/76
[52] U.S. Cl. .................................. 315/399; 358/190
[58] Field of Search .................... 315/399, 408, 411; 358/190

[56] References Cited

U.S. PATENT DOCUMENTS 4,536,684  8/1985  Babcock .............................. 315/411

Primary Examiner—Theodore M. Blum
Attorney, Agent, or Firm—Sim & McBurney

[57] ABSTRACT

The output voltage of a variable output voltage power supply is supplied to the deflection system of a raster scanned CRT and is controlled by a frequency responsive control signal generator so as to maintain peak to peak deflection current substantially constant despite scanning frequency variations. Picture width and/or height may be controlled in this way.

12 Claims, 5 Drawing Figures

YOKE CURRENT WAVEFORMS AT FREQUENCIES $F_1$ & $F_2$ $V_A$ — AMPLITUDE CONTROL VOLTAGE/CURRENT
$V_O$ — OSCILLATOR CONTROL VOLTAGE/CURRENT

REGULATION OF PICTURE SIZE WITH VARYING SCAN FREQUENCY

BACKGROUND OF THE INVENTION

This invention relates to systems for regulating either or both of the horizontal or vertical scan width or height of a raster scanned CRT deflection system. The invention is particularly useful in conjunction with computer terminal displays and data/graphics video projectors, for example, which may employ a very wide range of non-television standard horizontal scan rates.

A standard shunt or series (also called "boost") efficiency television line output system will drastically change both the picture size as well as the CRT anode voltage if adjusted over a wide range of operating frequencies. In copending U.S. patent application Ser. No. 250,262, filed Apr. 2, 1981 and entitled Regulation of the EHT Voltage of a CRT, there is disclosed a network that overcomes the latter problem. In accordance with the instant invention there is provided a solution to the former problem.

In U.S. Pat. No. 4,414,494, issued Nov. 8, 1983, Terrance C. Schmidt, a system for overcoming the former problem is disclosed. While this prior art system functions successfully to solve the problem, it does so by using a deflection current sensing device and a feedback loop. In accordance with the instant invention there is provided a system which overcomes the former problem in a direct way without a deflection current sensor and a feedback loop.

In a resonant efficiency magnetic horizontal deflection system, the display size (width) and high voltage (EHT) vary with the horizontal scan frequency. A decrease in horizontal scan frequency causes the width and high voltage to increase, while an increase in horizontal scan frequency causes both to decrease. This also is true of linear magnetic (non-resonant) raster scan systems such as are employed in vertical deflection, e.g., amplifiers of the push-pull type or of other types suitable for the purpose, which also may be employed in the practice of the present invention.

In a display system that has to accept horizontal scan frequencies over a wide frequency range, it therefore becomes necessary to regulate the display size (width) and EHT according to the horizontal scan frequency.

The deflection power of a resonant efficiency magnetic deflection system or of a linear magnetic (non-resonant) raster scan system can be expressed as:

$$P = Kf \quad (1)$$

where:
P is deflection power;
K is a constant that incorporates parameters of the picture tube and deflection yoke of a given system; and
f is the scan frequency.

As can be seen from equation (1), the deflection power is directly proportional to the scan frequency.

The deflection power also can be expressed as:

$$P = EI \quad (2)$$

where:
E is the power supply voltage for the deflection system (B+); and
I is the current supplied to the deflection system.

Equating (1) and (2)

$$EI = Kf \quad (3)$$

For the display size (width) and EHT to stay constant with a change in scan frequency, the peak to peak current through the deflection yoke also must stay constant, i.e., the deflection current also becomes a constant for a given system and display size.

Equation (3) can be expressed:

$$E = \frac{K}{I} f \quad (4)$$

Since K and I are systems constants, a new constant $$\alpha = K/I$$

can be defined and (4) becomes $$E = \alpha f \quad (5)$$

From equation (5) it may be seen that a practical solution for regulating the display size and EHT for varying scan frequencies would be to change the voltage (B+) to the deflection system according to the scan frequency.

It also can be seen from equation (5) that the relationship between the voltage supplied to the deflection system and the scan frequency is linear. This means that a control signal to regulate the voltage (B+) supplied to the deflection system can be derived directly from the scan frequency, which is the essence of the present invention. No sensors are required in the deflection system, and no feedback loops need be employed.

SUMMARY OF THE INVENTION

Various aspects of the invention are as follows:

In combination with a scanning system for a CRT, said system including a deflection coil and being of either the resonant efficiency magnetic type including a damper diode, a tuning capacitor and switching means or of the linear magnetic (non-resonant) type; a variable output voltage power supply responsive to a control signal for supplying a variable power supply voltage to said scanning system; a frequency responsive control signal generator; and means for supplying a variable frequency signal (i) to said scanning system to produce a scan of variable frequency and (ii) to said frequency responsive control signal generator to produce a control signal which decreases said power supply voltage in response to a decrease in frequency of said variable frequency signal and increases said power supply voltage in response to an increase in frequency of said variable frequency signal, thereby to maintain the magnitude of the peak to peak deflection current in said deflection coil substantially constant.

In combination with a scanning system for a CRT, said system including a deflection coil and being of either the resonant efficiency magnetic type including a damper diode, a tuning capacitor, and switching means or of the linear magnetic (non-resonant) type; a variable output voltage power supply responsive to a control signal for supplying a variable power supply voltage to said scanning system; a control signal controlled oscillator responsive to a control signal for supplying a variable frequency drive signal to said scanning system to produce a scan of variable frequency; a frequency responsive control signal generator for supplying a control signal to said variable output voltage power supply and a control signal to said control signal controlled oscillator; and means for supplying a variable frequency signal to said frequency responsive control signal generator to produce (i) a control signal which varies the frequency of the output of said control signal controlled oscillator to produce a scan of variable frequency and (ii) a control signal which decreases said power supply voltage in response to a decrease in frequency of said variable frequency signal and increases said power supply voltage in response to an increase in frequency of said variable frequency signal, thereby to maintain the magnitude of the peak to peak deflection current in said deflection coil substantially constant.

BRIEF DESCRIPTION OF THE DRAWINGS

This invention will become more apparent from the following detailed description, taken in conjunction with the appended drawings, in which.

DETAILED DESCRIPTION OF THE INVENTION INCLUDING THE PREFERRED EMBODIMENT

Figure 1:
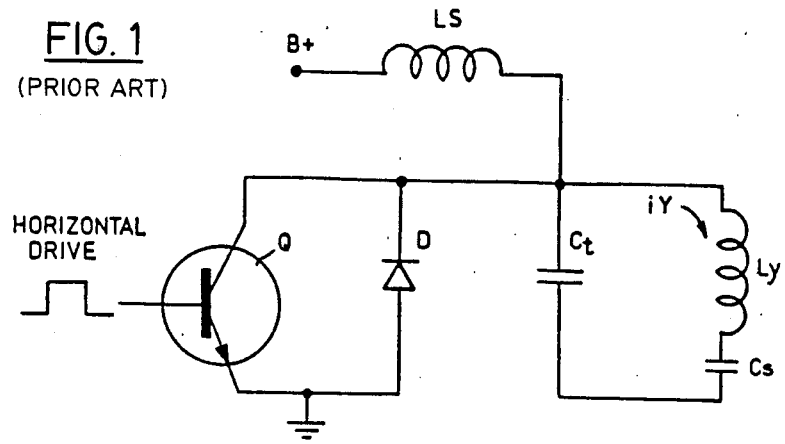
FIG. 1 shows a conventional resonant shunt efficiency line output stage.

Referring to FIG. 1, a standard resonant shunt efficiency line output stage consisting of a power switching transistor Q, a damper diode D and a tuning capacitor Ct is shown, these components being connected as indicated in the Figure. Ly is the horizontal deflection coil, Ls is an isolation coil and Cs is a D.C. blocking capacitor.

The operation of the resonant shunt efficiency line output stage shown in FIG. 1 is well known. The conduction of transistor Q is controlled by the horizontal drive network (not shown) which is connected to the base of transistor Q. The horizontal drive signal applied to the base of transistor Q is, in the instant invention, a signal that can vary widely in frequency.

An operating cycle may be considered to begin with the scan at the centre of the screen. At this time transistor Q is turned on and becomes a low impedance path. As a consequence, coil Ly is connected across a voltage supply (B+) and current increases in the coil are linear with time. At the right extreme of the CRT screen, transistor Q is switched off rapidly, abruptly breaking the flow of current from the power supply to coil Ly. However, current continues to flow in coil Ly but in the opposite direction as the magnetic field about the coil collapses returning its energy. The energy stored in the coil field, in fact, now is transferred to capacitor Ct, since capacitor Ct and coil Ly form a resonant circuit. A high voltage pulse is developed across capacitor Ct, and the oscillation of capacitor Ct and coil Ly is allowed to continue for one-half cycle, during which the current in coil Ly falls to zero. In the latter part of this half-cycle the energy stored in capacitor Ct is transferred back to coil Ly, so that its current increases from zero but in a negative direction. At the same time the voltage across capacitor Ct falls until it has reached zero and then begins a negative excursion. As the voltage across capacitor Ct tends to swing negative, damper diode D conducts, and damper current allows the transfer of energy stored in the magnetic field of coil Ly back to the B+ supply with the current in coil Ly decreasing linearly toward zero and effecting scan from the left to the centre of the screen, thus accomplishing a complete cycle involving scan from the centre of the screen to the righthand side, retrace and scan from the lefthand side to the centre of the screen.

Figure 2:
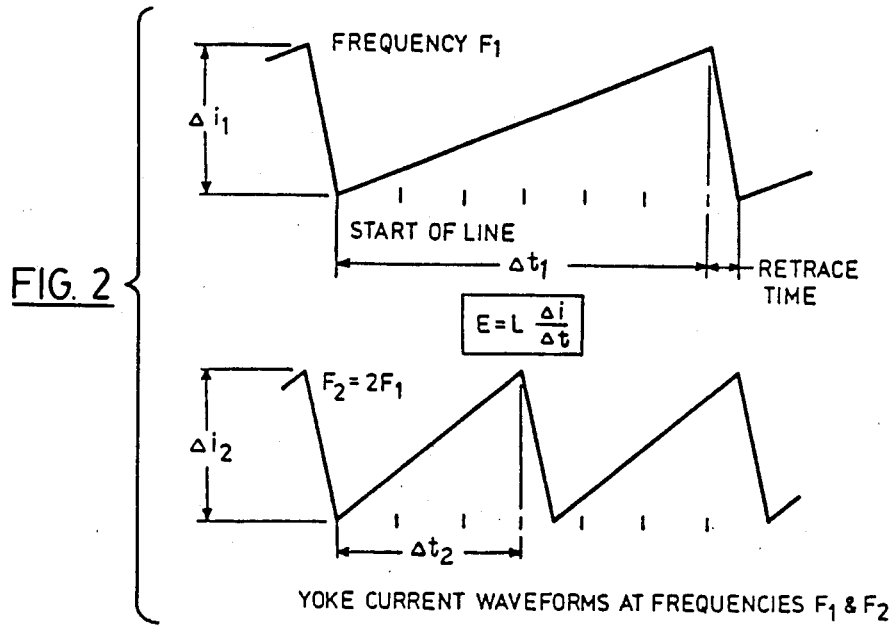
FIG. 2 is a diagram illustrating horizontal yoke current waveforms in the horizontal deflection coil of FIG. 1 at two different frequencies $F_1$ and $F_2$.

Referring to the waveforms shown in FIG. 2 and the governing equation also shown in that Figure, it can be seen that with a constant B+ input voltage, if the frequency of operation (and thus $\Delta t$) is changed, the peak to peak current in the horizontal deflection coil also will change proportionately. Since picture width is dependent on this current, it is this peak to peak current that must be maintained constant for constant picture width.

If the equation is rearranged as follows: $\Delta i = E/L \times \Delta t$, it can be seen that to maintain a constant $\Delta i$ with a changing $\Delta t$ (variable frequency), the only practical answer is to vary the input voltage E, since the inductance L cannot be varied.

Figure 3:
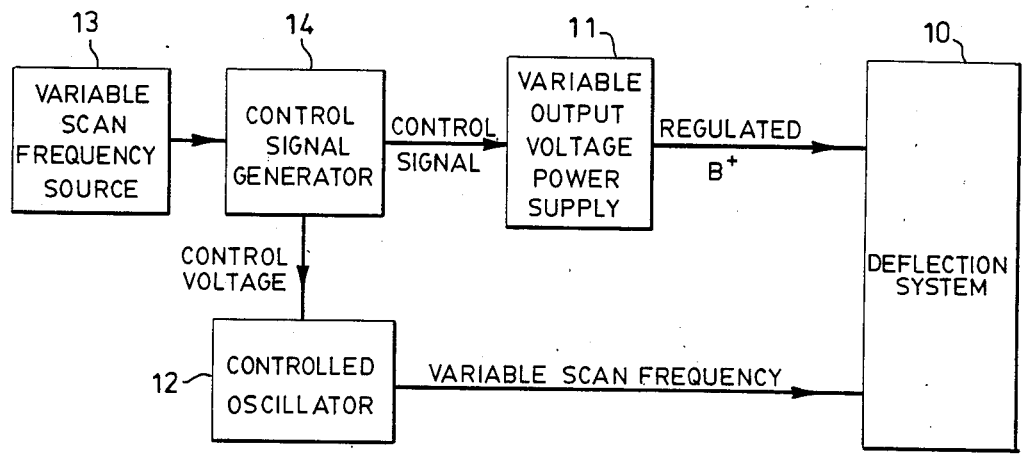
FIG. 3 is a block diagram illustrating one embodiment of the instant invention.

In accordance with the instant invention, the foregoing objective is achieved, in one embodiment of the invention, using the network shown in FIG. 3. Referring to that Figure, the deflection system of FIG. 1, for example, is shown at 10, but this deflection system may be any resonant efficiency magnetic deflection system employing a damper diode, tuning capacitor, switching means and deflection coil. It may be, for example, a resonant series efficiency type of magnetic deflection system. In addition, where picture height rather than width is to be controlled, deflection system 10 will be the vertical deflection system for a CRT rather than its horizontal deflection system. Of course the invention may be applied to both the horizontal and vertical deflection systems to control both picture width and height.

Also shown in FIG. 3 is a variable output voltage power supply 11 that provides a variable B+ to deflection system 10 in response to variations in a control signal (voltage or current); a control signal controlled oscillator 12 that is responsive to the control signal for supplying a variable frequency drive signal to deflection system 10 to produce a scan of variable frequency; a variable scan frequency source 13; and a frequency responsive control signal generator 14 that receives variable frequency signals from source 13 and produces control signals for variable output voltage power supply 11 and control signal controlled oscillator 12.

The frequency of control signal controlled oscillator 12 tracks the frequency of source 13 to produce a scan of variable frequency.

The control signal from generator 14 which, as mentioned previously, may be a current or a voltage, controls the output (B+) of variable output voltage power supply 11 such that B+ is decreased when the frequency of source 13 decreases and increased when the frequency of source 13 increases, as a result of which the magnitude of the peak to peak deflection current in the deflection coil is maintained substantially constant, thereby maintaining picture width or height substantially constant depending upon whether deflection system 10 is the horizontal deflection system of a CRT or the vertical deflection system thereof.

While the use of a controlled oscillator 12 is desirable for phase control purposes, it could be eliminated and one output of source 13 supplied directly to a wave shaping network preceding deflection system 10.

Figure 4:
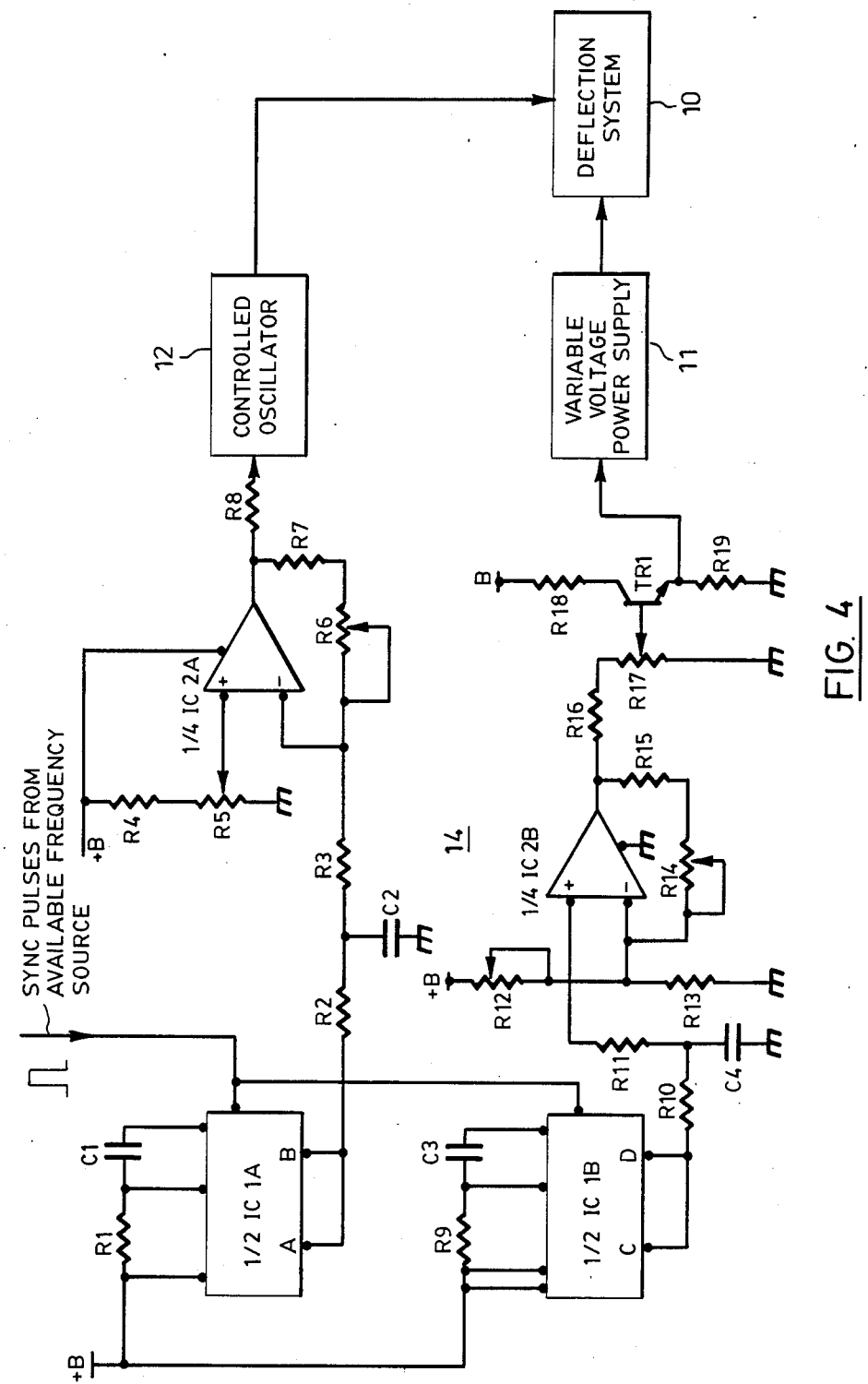
FIG. 4 is a circuit diagram, partly in block form and partly schematic, showing the embodiment of FIG. 3 in greater detail.

Referring to FIG. 4, one form of control signal generator 14 that may be used in practising the present invention is shown. In this case the control signal is a control voltage. The variable scan frequency source 13 is not shown in FIG. 4 but is, in fact, a sync separator producing sync pulses. Variable voltage power supply 11 and voltage controlled oscillator 12 are known per se and need no detailed description, i.e., they can be off-the-shelf hardware.

The operation of control voltage generator 14 may be described as follows. Both halves of IC 1, namely, IC 1A and IC 1B are connected in a multivibrator configuration and are triggered by the sync pulses from the variable frequency source. At the output terminals A, B, C and D of IC 1A and IC 1B appear positive-going pulses of the same frequency as the sync pulses from the variable frequency source but of different width. The width of these pulses decreases as the frequency changes from its lowest limit F1 to its highest limit F2. These pulses are integrated by resistor R2 and capacitor C2 and by resistor R10 and capacitor C4 and charge capacitors C2 and C4 to levels which are dependent on frequency. In the embodiment shown, the highest potential is obtained at the low frequency limit, while the lowest potential is obtained at the high frequency limit. Capacitors C2 and C4 thus are the sources for the control signals required by controlled oscillator 12 and variable voltage power supply 11.

IC 2 is an operational amplifier which serves to (a) amplify the control signals from capacitors C2 and C4 to the exact levels required by controlled oscillator 12 and variable voltage power supply 11 and (b) transform them to the required polarity.

For example, controlled oscillator 12 may require the following control signals:

| at 15.75 KHz | +7.0 V |
|---|---|
| at 24 KHz | +8.6 V |

Potentials on capacitor C2 are:

| at 15.75 KHz | +8.9 V |
|---|---|
| at 24 KHz | +7.4 V |

As can be seen, controlled oscillator 12 requires a signal that goes from a lower value at the low frequency to a higher value at the high frequency. However, capacitor C2 does just the opposite and has a higher potential at the lower frequency and vice versa. Therefore, the polarity of the signal must be changed. This is done by feeding the signal from capacitor C2 to the negative (or "inverting") input of IC 2A.

However, it still is necessary to adjust for correct levels. This is done as follows. At the lowest frequency F1 (15.75KHz) control potentiometer R5 is adjusted to obtain +7V at the output of IC 2A. The frequency then is changed to 24KHz and potentiometer R6 is adjusted to obtain +8.6V at the output of IC 2A.

The same explanations as above pertain to IC 1B and IC 2B.

Potentiometer R17 is a divider to obtain correct levels, and transistor TR1 is a power amplifier, since IC 2B cannot deliver the power to drive variable power supply 11.

It will be understood, of course, that many variations of control signal generator 14 may be devised to perform the same basic functions and that the frequency range and voltages noted above are exemplary only.

As indicated previously, the instant invention also may be practised with linear magnetic (non-resonant) raster scan systems. Linear amplifiers, as a rule, are not employed at horizontal frequencies, since they are not efficient given the parameters of horizontal deflection components. However, at vertical frequencies they are efficient and cost effective and can be used in the practice of the instant invention.

Figure 5:
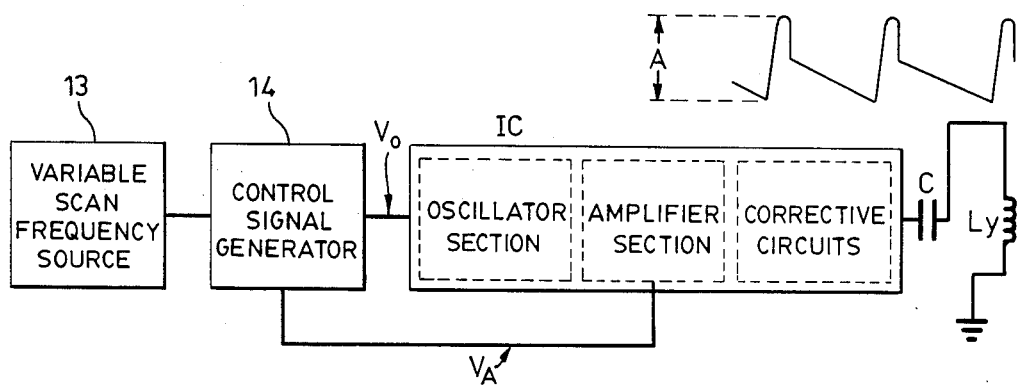
FIG. 5 illustrates another embodiment of the invention employing a linear magnetic (non-resonant) raster scan system.

While the formulae previously noted on page 3 of the instant application apply equally to the vertical deflection components, e.g., the deflection current through the vertical deflection coil must remain constant for a given display size (height), and, while to achieve this, the B+ could be changed in the same way as described before, it is more convenient and cost effective to proceed differently, as will become more apparent in connection with FIG. 5.

However, before proceeding with a discussion of FIG. 5, several basic points should be made about linear, resistive amplifiers, which a vertical deflection amplier is except during retrace. Thus, each amplifier works between two potentials—one low (generally "ground") or a negative potential and one high—some B+ potential, e.g., +15V.

Consider a load connected across this amplifier. Also consider a signal connected to the amplifier that produces across the load a signal of 15V peak to peak amplitude. (In practice this is not possible because of saturation effects, but it will serve to illustrate the idea). The 15V peak to peak signal across the load (the vertical deflection coil) produces a certain peak to peak current and, therefore height.

If it is necessary to reduce the height, the peak to peak current through the deflection coil would have to be reduced. This could be done by reducing the B+ from +15V to, say, +12V. However, the signal connected to the amplifier produces a peak to peak signal of 15V across the load with +15V of B+. The maximum signal with a B+ of +12V only can be 12V peak to peak, e.g., the signal will be distorted. To have a distortion free signal across the load, the signal applied to the amplifier also must be lowered when B+ is lowered, i.e., both quantities must be controlled rather than just B+, as is the case in the horizontal section. Because of this, a linear resistive amplifier never is allowed to achieve a peak to peak signal level equal to the B+ level, except during retrace, but is kept to a much lower level, typically 50 to 75% of the B+ level, and certainly to less than B+ minus the saturation point of the amplifier. Also, because of this B+ can be left alone and the signal level across the load can be changed to achieve a reduction in current and therefore, height. To control the peak to peak signal level across the load, all that is necessary is to control the bias level on one of the amplifiers in the chain.

FIG. 5 shows one variation of a vertical linear amplifier employing an integrated circuit containing oscillator and amplifier sections and corrective circuits. Many variants of such circuits are possible, both with IC's and discrete components.

Referring to FIG. 5, as in the case of the embodiment shown in FIG. 3, two control signals are derived from variable scan frequency source 13, one, $V_O$ for oscillator control and the other, $V_A$ for amplitude control rather than for B+ control. In an IC amplifier the most convenient point to control the amplitude of the peak to peak signal across the deflection coil is the pin that has the height control connected to it. In the case of amplifiers built with discrete components, the most convenient point should be selected, i.e., where the amplitude responds to a change in a DC potential and no other corrective changes are required.

It should be noted, however, that the essential mode of operation of the embodiments of the invention shown in FIGS. 3 and 5 is the same. Thus, as previously pointed out, a linear resistive amplifier never is allowed to reach signal levels equal to the B+ level, but is restricted to somewhere between 50% to 75% of the B+ level. If this were not the case, distortion would result.

What the signal level is now must be considered. Assume, for example, a B+ level of +15V and a signal level of 5V peak to peak, with the most positive point at the +12V level and the least positive point at the +7V level. The 5V peak to peak signal represents two points of B+ levels, e.g., $B_1=12V$ and $B_2=7V$. In other words, what is being impressed across the load (the vertical deflection coil) is a fraction of the B+ voltage, namely 5V, and this produces a certain height. If the height is to be decreased, a smaller fraction of the B+ voltage must be impressed across the load, say, 4V, with the most positive peak at $B_1=12V$ and the least positive peak at $B_2=8V$. In controlling the height what is in fact being controlled is the fraction of the B+ applied across the load, which is precisely the same principle as is involved in the operation of the embodiment of FIG. 3.

It should be apparent from the foregoing that, in accordance with one aspect of the invention, the output voltage of a variable output voltage power supply is supplied to the horizontal (or vertical) deflection system (FIG. 3 embodiment) while, in accordance with another aspect of the invention, variable fractions of a fixed power supply may be supplied to the vertical deflection system (FIG. 5 embodiment), in both cases under the control of a frequency responsive control signal generator so as to maintain peak to peak deflection currents constant despite scanning frequency variations. A fixed power supply with an output of variable fractions of the total thereof is, in fact, a variable output voltage power supply and is so referred to herein and in the claims.

In the case of the embodiment of the invention shown in FIG. 5, it will be understood that equation (5) in fact will be $E_1-E_2=\alpha f$ where $E_1-E_2$ is a fraction of B+ supplied to the vertical deflection system shown in FIG. 5.

While preferred embodiments have been described and illustrated herein, the person skilled in the art will appreciate that changes and modifications may be made therein without departing from the spirit and scope of this invention as defined in the appended claims.

THE EMBODIMENTS OF THE INVENTION IN WHICH AN EXCLUSIVE PROPERTY OR PRIVILEGE IS CLAIMED ARE DEFINED AS FOLLOWS:

1. In combination with a scanning system for a CRT, said system including a deflection coil and being of either the resonant efficiency magnetic type including a damper diode, a tuning capacitor and switching means or of the linear magnetic (non-resonant) type; a variable output voltage power supply responsive to a control signal for supplying a variable power supply voltage to said scanning system; a frequency responsive control signal generator; and means for supplying a variable frequency signal (i) to said scanning system to produce a scan of variable frequency and (ii) to said frequency responsive control signal generator to produce a control signal which decreases said power supply voltage in response to a decrease in frequency of said variable frequency signal and increases said power supply voltage in response to an increase in frequency of said variable frequency signal, thereby to maintain the magnitude of the peak to peak deflection current in said deflection coil substantially constant.

2. The invention according to claim 1 wherein said scanning system is a horizontal scanning system, said deflection coil is a horizontal deflection coil, said deflection current is horizontal deflection current and the width of the picture displayed by said CRT is maintained substantially constant.

3. The invention according to claim 1 wherein said scanning system is a vertical scanning system, said deflection coil is a vertical deflection coil, said deflection current is vertical deflection current and the height of the picture displayed by said CRT is maintained substantially constant.

4. The invention according to claim 1 wherein said scanning system is of the resonant shunt efficiency magnetic type.

5. The invention according to claim 1 wherein said scanning system is of the resonant series efficiency magnetic type.

6. The invention according to claim 1 wherein said scanning system is of the linear magnetic (non-resonant) type.

7. In combination with a scanning system for a CRT, said system including a deflection coil and being of either the resonant efficiency magnetic type including a damper diode, a tuning capacitor and switching means or of the linear magnetic (non-resonant) type; a varible output voltage power supply responsive to a control signal for supplying a variable power supply voltage to said scanning system, a control signal controlled oscillator responsive to a control signal for supplying a variable frequency drive signal to said scanning system to produce a scan of variable frequency; a frequency responsive control signal generator for supplying a control signal to said varible output voltage power supply and a control signal to said control signal controlled oscillator; and means for supplying a variable frequency signal to said frequency responsive control signal generator to produce (i) a control signal which varies the frequency of the output of said control signal controlled oscillator to produce a scan of variable frequency and (ii) a control signal which decreases said power supply voltage in response to a decrease in frequency of said variable frequency signal and increases said power supply voltage in response to an increase in frequency of said variable frequency signal, thereby to maintain the magnitude of the peak to peak deflection current in said deflection coil substantially constant.

8. The invention according to claim 7 wherein said scanning system is a horizontal scanning system, said deflection coil is a horizontal deflection coil, said deflection current is horizontal deflection current and the width of the picture displayed by said CRT is maintained substantially constant.

9. The invention according to claim 7 wherein said scanning system is a vertical scanning system, said deflection coil is a vertical deflection coil, said deflection current is vertical deflection current and the height of the picture displayed by said CRT is maintained substantially constant.

10. The invention according to claim 7 wherein said scanning system is of the resonant shunt efficiency magnetic type.

11. The invention according to claim 7 wherein said scanning system is of the resonant series efficiency magnetic type.

12. The invention according to claim 7 wherein said scanning system is of the linear magnetic (non-resonant) type.

* * * * *